US012570537B2

(12) United States Patent
DuPont et al.

(10) Patent No.: US 12,570,537 B2
(45) Date of Patent: Mar. 10, 2026

(54) PROCESSES FOR RECOVERING LITHIUM VALUES FROM LITHIUM-CONTAINING BRINES

(71) Applicant: Albemarle Corporation, Charlotte, NC (US)

(72) Inventors: Jesse DuPont, Zachary, LA (US); Jeffrey Ross LeBlanc, Lafayette, LA (US); Keyur Shah, Waxhaw, NC (US); Sameer Talreja, Zachary, LA (US)

(73) Assignee: Albemarle Corporation, Charlotte, NC (US)

( * ) Notice: Subject to any disclaimer, the term of this patent is extended or adjusted under 35 U.S.C. 154(b) by 0 days.

(21) Appl. No.: 18/781,703

(22) Filed: Jul. 23, 2024

(65) Prior Publication Data

US 2024/0375972 A1    Nov. 14, 2024

Related U.S. Application Data

(60) Provisional application No. 63/622,620, filed on Jan. 19, 2024.

(51) Int. Cl.
B01D 9/00          (2006.01)
B01D 15/04         (2006.01)
(Continued)

(52) U.S. Cl.
CPC ............. C01D 15/04 (2013.01); B01D 9/004 (2013.01); B01D 61/0271 (2022.08); C01D 15/08 (2013.01); C01P 2006/80 (2013.01)

(58) Field of Classification Search
CPC .......... C01D 15/04; C01D 15/08; C01D 3/06; B01D 9/004; B01D 61/0271;
(Continued)

(56) References Cited

U.S. PATENT DOCUMENTS

| | | |
|---|---|---|
| 3,181,934 A | 5/1965 | Davis |
| 4,719,096 A | 1/1988 | Lesher |

(Continued)

FOREIGN PATENT DOCUMENTS

| | | |
|---|---|---|
| CN | 102631897 B | 8/2012 |
| CN | 111215040 | 6/2020 |

(Continued)

OTHER PUBLICATIONS

English language machine translation of CN117344156A, 16 pages, No Date.*

(Continued)

*Primary Examiner* — Pranav N Patel
(74) *Attorney, Agent, or Firm* — KDW Firm PLLC

(57)          ABSTRACT

Producing high purity lithium solution from a source brine containing at least 1 mg Li/kg brine, preferably 10 mg/kg, more preferably 25 mg Li/kg brine; treating the source brine, if necessary in pretreatment steps; processing the treated brine in a lithium adsorption step; after the adsorption step, desorbing the adsorbed lithium in a desorption step; after the desorption step, treating the desorption effluent in an enrichment step. Specified optional steps and new features can be used to increase lithium concentrations and purity.

27 Claims, 1 Drawing Sheet

(51) Int. Cl.

| | | |
|---|---|---|
| *B01D 61/02* | (2006.01) | |
| *C01D 15/04* | (2006.01) | |
| *C01D 15/08* | (2006.01) | |

(58) Field of Classification Search

CPC .... B01D 61/025; B01D 61/027; B01D 61/58; C01P 2006/80

See application file for complete search history.

(56) References Cited

U.S. PATENT DOCUMENTS

| | | | |
|---|---|---|---|
| 4,725,625 A | 2/1988 | Simon | |
| 4,978,518 A | 12/1990 | Lesher | |
| 5,158,683 A | 10/1992 | Lin | |
| 5,458,781 A | 10/1995 | Lin | |
| 5,599,516 A | 2/1997 | Bauman | |
| 6,280,693 B1 | 8/2001 | Bauman | |
| 10,648,061 B2 | 5/2020 | Cheng | |
| 2018/0147532 A1 | 5/2018 | Switzer | |
| 2018/0245180 A1* | 8/2018 | Cheng | B01J 20/28004 |
| 2018/0353807 A1 | 12/2018 | Pogue | |
| 2019/0256368 A1 | 8/2019 | Marston | |
| 2021/0087697 A1 | 3/2021 | Riabtsev | |
| 2022/0274062 A1* | 9/2022 | Moxon | B01D 15/3828 |
| 2023/0227937 A1* | 7/2023 | Zhao | C22B 3/42 |
| | | | 423/179.5 |
| 2024/0190723 A1* | 6/2024 | Binet | C02F 1/28 |

FOREIGN PATENT DOCUMENTS

| | | | | | |
|---|---|---|---|---|---|
| CN | 115385497 A | * | 11/2022 | | |
| CN | 115521011 A | * | 12/2022 | | C01D 3/06 |
| CN | 115924940 A | * | 4/2023 | | |
| CN | 117344156 A | * | 1/2024 | | |
| WO | 2022198343 A1 | | 9/2022 | | |

OTHER PUBLICATIONS

English language machine translation of CN-115385497-A, 8 pages, No Date.*

English language machine translation of CN115521011A, 15 pages, No Date.*

English language machine translation of CN115924940, 8 pages, No Date.*

Kirk-Othmer, "Bearing Materials to Carbon," Encyclopedia of Chemical Technology, Fourth Edition, vol. 4: 548-553 (1992).

International Search Report and Written Opinion of the International Searching Authority in International Application No. PCT/US2024/39156, mailed Oct. 21, 2024, 9 pages.

* cited by examiner

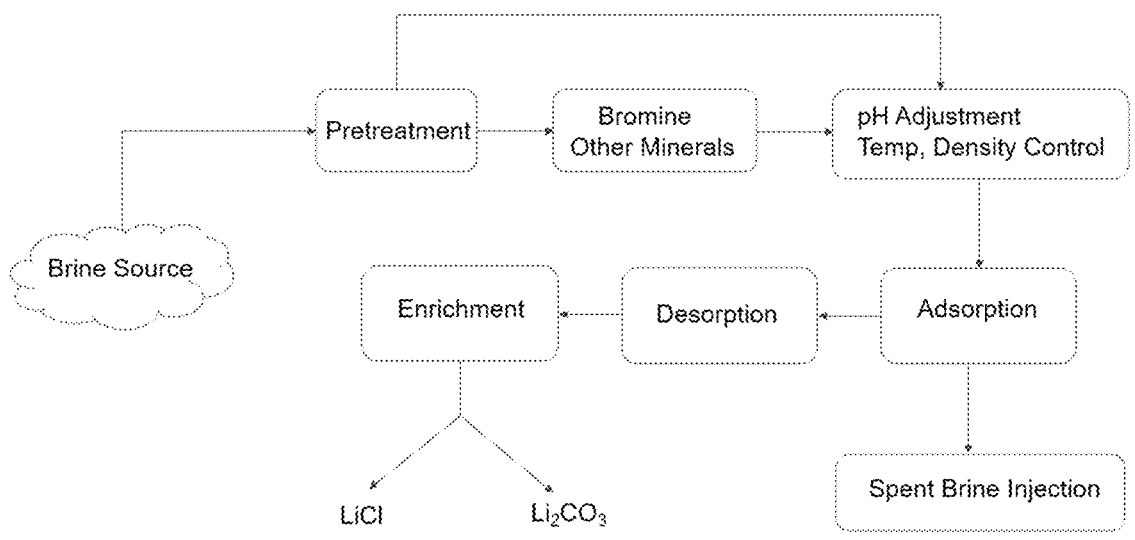

PROCESSES FOR RECOVERING LITHIUM VALUES FROM LITHIUM-CONTAINING BRINES

RELATED APPLICATIONS

This application claims the benefit of U.S. Provisional Patent Application Ser. No. 63/622,620, filed Jan. 19, 2024, the disclosure of which is incorporated by reference herein in its entirety.

TECHNICAL FIELD

This invention relates to new economical and practical process technology for recovering lithium values from lithium-containing brines to obtain water-soluble lithium salts such as LiCl or Li2CO3 of high purity and in high yields in addition to other valuable minerals or elements.

BACKGROUND

As is well known, in recent years a need has arisen for more economical and efficient technology enabling production of high purity lithium or its salts from suitable sources. This is reflected by an increase in research activities devoted to this subject. And it appears that this need has not been fulfilled yet by any published prior art. This particular process is useful in brine fields contaminated with organic pollutants, such as oil and gas and other hydrocarbons, as well as inorganic contaminants, such as H2S, FeS, Fe salts.

NON-LIMITING SUMMARY OF THE INVENTION

This summary lists several embodiments of the presently disclosed subject matter, and in many cases lists variations and permutations of these embodiments. This summary is merely exemplary of the numerous and varied embodiments. The mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

This invention utilizes a particular combination of separation techniques that has the capability of fulfilling the need for more efficient and economical process technology for recovering lithium from various brine sources. Based on results presented hereinafter, it is believed reasonable to suggest that such combination and sequence of separation techniques will produce an aqueous solution of a lithium salt such as lithium chloride of high purity and in high yield in an economical and practical manner.

The above process is generally used with initial lithium-containing brines containing a dissolved lithium content of preferably at least 100 ppm, but also including 50-100 ppm or less preferably 30-50 ppm. However, there are situations in which one or more optional additional steps may be used pursuant to this invention. A further preferred embodiment of the multi-step process of the invention is wherein said source of dissolved lithium is from a natural or industrial brine that has a lithium concentration of at least about 100 ppm, preferably greater than about 180 ppm and is concentrated with sodium salt which enhances the recovery of lithium in the sorption operation.

A preferred embodiment of the process is wherein the lithium containing brine is initially treated in order to adjust the properties of the brine to be suitable for further treatment. For example, it may be necessary to adjust the pH, the temperature or the density of the brine. In a preferred embodiment, the brine introduced to the next step should have a temperature of less than bubble point of the solution at operational pressures. For atmospheric systems that may be about 110° C., preferably less than about 90° C., and more preferably less than about 82° C., have a TDS/Li ratio of less than about 5000 (For instance but not limited to 25% salt and 50 ppm Li or better or 10% salt and 20 ppm Li or better or 1% salt and 2 ppm Li or better).

Next, the brine is introduced into a lithium adsorption step. The lithium adsorption step which is in a highly preferred multi-step process of this invention is conducted by passing the lithium containing brine into and out of the sorbent bed—which is preferably placed in a column or other suitable contact vessel—at a brine temperature of 40-110° C., preferably 50-90° C., until lithium breakthrough in the effluent from the bed. Any suitable sorbent can be used however in this novel process, such as described in CN111215040B, CN102631897 B, or U.S. Pat No. 10,648, 061.

The brine is then put through a desorption process step. The lithium desorption step of the preferred multi-step process of this invention is conducted by washing the sorbent with water or other aqueous solutions preferably a dilute lithium chloride or other lithium salt solution preferably containing 50-300 ppm Li, at a temperature of 40-100° C. or even higher under increased pressure, preferably greater than 50° C., and more preferably greater than 60° C.

A further preferred embodiment of the multi-step process of the invention is wherein said lithium eluent solution comprises at least Ca2+ and/or Mg2+ impurities in solution and in a weight ratio of dissolved Li+:Ca2+ and/or Li+: Mg2+ is enriched by a factor of at least 5, preferably at least 10, and more preferably 100. For example, if a brine has a starting point of 150 Ca:Li, the process would improve the ratio to less than 30:1 and preferably less than 15:1 Ca:Li and more preferably 1.5:1. In another further preferred embodiment the Ca:Li ratio could be further improved from an initial 150:1 to 0.6:1. Through optimization of the embodiment, separate ratios could be achieved during the desorption process. Of the 0.6:1 Ca:Li, for instance, multiple fractions could be obtained at differing purity ratios, for instance: 2.5, 0.6, and 0.03 Ca:Li ratios.

After desorption, the brine is then prepared for an enrichment process. Prior to the enrichment process, it may be necessary to further treat the brine. Specifically, it may be necessary to remove impurities, such as oil and grease, free halogen, and/or other free solids and impurities. Generally the enrichment process should result in a substantively concentrated and purified LiCl solution of quality sufficient to be further processed into either lithium metal, LiOH, LiCl, Li2CO3 or other valuable lithium minerals. For example, in a preferred embodiment of Li2CO3 desorption effluent should have lithium concentrations of 0.25% to 5%, preferably 0.5 to 3.5% and more preferably 0.8 to 1.25%. For a preferred embodiment in the production of LiCl, the desorption effluent should have a lithium concentration of 1%-13%, preferably 2-12% and more preferably 4-8%, as well as suitable concentrations of contaminants such as boron, calcium, magnesium, and sodium among others. A suitable ratio for boron is greater than 500:1 lithium:boron or 2000:1, preferably greater than 5000:1 or 20000:1, and more preferably greater than 8000:1 or 40000:1 by mass respectively. A suitable ratio for calcium is greater than 50:1 or 200:1 lithium to calcium, preferably greater than 100:1 or 400:1 lithium to calcium, or more preferably greater than 160:1 or 800:1 lithium to calcium by mass. Likewise a suitable ratio for magnesium is greater than 108:1 or 434:1 lithium to magnesium, preferably greater than 217:1 or 869:1 lithium to magnesium, or more preferably greater than 347:1 or 1739:1 lithium to magnesium by mass. A suitable strontium or other divalent content would follow with the stated calcium or magnesium scheme corrected for the difference in mass from one divalent cation relative to calcium or magnesium. A suitable ratio for sodium is less than 20:1 or 5:1 sodium to lithium, preferably 10:1 or 2.5:1 sodium to lithium, or more preferably less than 6.25:1 or 1.25:1 sodium to lithium by mass. A suitable potassium or other monovalent content would follow with the stated sodium scheme corrected for the difference in mass from one monovalent cation relative to sodium.

In an embodiment of the enrichment process, enrichment can be include one more of the following steps: nanofiltration, membrane distillation, reverse osmosis, cation and/or anion resin purification, electrodialysis forward osmosis, Osmotically Assisted Reverse Osmosis (OARO), ultrafiltration, chemical precipitation, evaporative or cooling crystallization or precipitation, solvent extraction, and/or a evaporation techniques. Each of the steps may be performed in any order and may be repeated as necessary to obtain a suitable brine effluent.

Finally, the lithium enriched brine effluent is processed for final product. Typically, the final product for these lithium solutions is either lithium metal, lithium sulfide, lithium phosphate, LiOH, LiBr, Li2SO4, LiCl, or Li2CO3. These steps can be performed by those steps known to those skilled in the art. As a result of the above process, it is preferred wherein at least 25% or more, preferably about 80% or more, or still more preferably about 90% or more of lithium is extracted from the source of lithium into the sorbent. The total recovery may occur over multiple passes through the process.

The above steps are the basic process of the proposed invention. A feature of the invention is the ability to customize the process further widening the range of useful brines and bringing additional economic benefits. The first optional additional process is a pretreatment step. Certain brines, such as those from the Smackover and oilfields, are often contaminated with materials unsuitable for lithium extraction. For example, brines may contain hydrocarbons, solids and H2S. Therefore, in a further embodiment, the initial brine is subject to a pretreatment step wherein impurities are removed.

In a further embodiment, the brine may contain additional economically beneficial materials. These materials include bromine and elemental sulfur, sulfur compounds, iodine, boron and/or cesium and the like. Therefore, an embodiment of the invention is to provide a step to remove these additional economically beneficial materials. This step may occur at anywhere along the process but preferably either prior to the removal of lithium or after the removal of lithium. This step can be accomplished by any known method in the art.

In a further embodiment, recycling steps may be added to the process. These recycling steps improve the overall lithium recovery and control the amount of liquid necessary for the performance of the lithium removal and contribute to a net zero increase in hydraulic rate of return injection into the brine source formation. These and other steps will be discussed in detail below.

Thus, the conduct of one or more additional steps beyond those described herein in performing a multi-step process of the invention falls within the scope of the claim coverage of this invention.

The above and other embodiments, objectives, features, and advantages of this invention will become still further apparent from the ensuing description, appended claims, and accompanying drawings.

BRIEF DESCRIPTION OF THE DRAWINGS

The presently disclosed subject matter can be better understood by referring to the following example FIGURE. The components in the FIGURE are not necessarily to scale, emphasis instead being placed upon illustrating the principles of the presently disclosed subject matter (often schematically). In the FIGURE, like reference numerals designate corresponding parts throughout the different views. A further understanding of the presently disclosed subject matter can be obtained by reference to an embodiment set forth in the illustrations of the accompanying drawing. Although the illustrated embodiment is merely for purposes of example of systems for carrying out the presently disclosed subject matter, both the organization and method of operation of the presently disclosed subject matter, in general, together with further objectives and advantages thereof, may be more easily understood by reference to the drawings and the following description. The drawing is not intended to limit the scope of this presently disclosed subject matter, which is set forth with particularity in the claims as appended or as subsequently amended, but merely to clarify and provide examples of the presently disclosed subject matter.

FIG. 1 is general representation of the process of the present invention.

FURTHER DETAILED DESCRIPTION OF THIS INVENTION

Definitions

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus, the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the term "concentrated" when used in connection with a solution or in connection with a brine is meant to include a solution or brine that is saturated.

General Procedure

With reference to FIG. 1, the general procedure is as follows. Brine is removed from the source, such as the Smackover, oilfield, or other source of lithium rich brine. If necessary, the brine is routed to one or more pretreatment stages. Potential stages of pretreatment include, bulk removal of oil via any number of commercially available technologies including at a minimum any combination of: oil/phase separators, hydrocyclone, inclined plate coalescers, coarse coalescers, induced gas flotation (IGF) units, deoiling cartridge filters, organoclay products, Macro Porous Polymer Extraction technology, crushed nut shell filtration bed, acid stripping followed by gravity settling, electrocoagulation technology, a light oil stripper and H2S stripper, as is known in the art. After the brine is pretreated, in some embodiments it may be sent to a processing unit to remove additional valuable materials. However, this step could occur anywhere along the process such as after the Lithium has been removed.

Once the brine is ready for the removal of lithium, it may be sent to a cooling tower for temperature and temperature, density, and concentration adjustment. The brine solutions of the Smackover, for example, come up from the ground at excessive temperatures. The brine solution temperature will in some embodiments be reduced to a temperature less than bout 80° C. to less than about 110° C., optionally the temperature will need to be reduced to less than about 105° C., preferably less than about 90° C., and more preferably less than about 82° C. The brine is then processed in the Lithium adsorption and desorption step. Once the lithium has been adsorbed and desorbed, the desorb effluent brine is sent to an enrichment processing step.

After the enrichment step, the lithium enriched brine effluent is prepared for production and turned into a final product.

Initial Brine Adjustment

Preferably, the brine as received for processing has or is adjusted to have (i) a pH value in the range of about pH 3 to about pH 9, preferably about pH 3.5 to about pH 8, and more preferably about pH 4.0 to about pH 7.5, (ii) limited dissolved and free phase organic compounds, and (iii) no or minimum amount of foreign solids, e.g. less than about 5%, 4%, 3%, 2%, 1%, 0.5% or 0.1%, optionally less than about 500 ppm, optionally less than about 100 ppm. Preferably, the brine has a high osmotic strength, preferably generated by a salt content but may be maintained by addition of salts or other osmotic strength adjusting agents, including but not limited to salts with cations Na, Ca, Mg, and K, or through removal of a fraction of the solution water. Technologies for the pretreatment of the brine are well known to those skilled in the art, such as neutralization by adding acid or base, liquid phase separation, and filtration.

To the extent it is desirable to remove native hydrocarbons or other organics at this stage, it is desirable to treat the brine such that native hydrocarbons or other organics present as dissolved and free phase organics should be less than about 0.3 wt %, preferably be less than about 0.2 wt %, more preferably less than about 0.1 wt %, most preferably less than about 180 ppm and free of heavy crude oil components. "Native hydrocarbons or other organics" are those hydrocarbons or organics that are present in the brine pumped from the formation as opposed to those added during the process. To the extent it is desirable to remove solids, it is desirable to have a solids content of less than about 1000 ppm, preferably less than about 500 ppm, and more preferably less than about 100 ppm.

In addition, it may be beneficial to remove halogenated oxidation impurities. Oxidative halogen species may include elemental chlorine, bromine, or iodine, as well as their molecular and ionic counterparts of damaging oxidation potential. Other oxidizers such as peroxide and ozone should also be suitably reduced or otherwise removed.

A preferred embodiment of the process is wherein lithium containing brine is initially treated in order to adjust the properties of the brine to be suitable for further treatment. For example, it may be necessary to adjust the pH, the temperature or the density of the brine. In a preferred embodiment, the brine introduced to the next step should have a temperature of less than the bubble point of the solution at processing conditions and that allows for suitable materials of constructions, for example less than about 80° C. to less than about 110° C., optionally the temperature will for example be less than about 105° C., preferably less than about 90° C., and more preferably less than about 82° C., have a TDS/Li ratio of less than about 5000 (for example about 25% salt and 50 ppm Li or better).

Adsorption and Desorption of the Brine Effluent

Typically, the brine is then introduced into a lithium adsorption step. The lithium adsorption step which is conducted by passing the lithium containing brine into and out of the sorbent bed—which is preferably placed in a column or other suitable contact vessel—at a brine temperature of about 40° C. to about 110° C., preferably about 50° C. to about 90° C., until lithium breakthrough in the effluent from the bed. "Breakthrough" is determined based on the goals and economics of the process being utilized. For example, "breakthrough" may occur when it's first determined that at least about 25% of the lithium has been adsorbed, more preferably more than about 80% of the lithium has been adsorbed, most preferably more than about 90% of the lithium has been adsorbed. The sorbent can recover lithium from brine of any concentration, although the higher the initial lithium concentration in the brine, the higher will be the sorbent take-up or load of sorbed lithium when breakthrough has occurred.

In the practice of processes for recovering lithium values from lithium-containing brines in accordance with this invention, a sorbent is used for treating the brine as received from its source, and if necessary or desired, after such brine has been pretreated as above. Any suitable sorbent can be used however in this novel process, such as described in CN111215040B, CN102631897 B, or U.S. Pat No. 10,648, 061. Further, use may be made of known lithium sorbents disclosed for example in U.S. Pat. Nos. 5,599,516 and 6,280,693. These patents disclose polycrystalline hydrated alumina sorbents based on a hydrated alumina such as crystalline Gibbsite, bayerite, nordstrandite or bauxite. These sorbents are morphologically altered by the infusion therein of lithium salts which creates active lithium-specific sites within the crystal layers of the alumina. One example of infused sorbent particles, having the formula $LiOH \cdot 2Al(OH)_3$ and lithium loading up to 0.33 mol fraction, are converted to $LiCl \cdot 2Al(OH)_3$ by neutralization with HCl, and can then be used in the present process of removing lithium values from brine.

One of the potential substances used in the practice of this invention is "hydrated alumina" which is also known in the art by a variety of terms such as alumina hydrate, alumina trihydrate, or aluminum hydroxide. It is also often identified by use of the acronym "ATH". Typically, these materials are assigned the formula $Al(OH)_3$ or $Al_2O_3 \cdot 3H_2O$. Thus, these and any other named substance of the same chemical character as any of these named materials such as Gibbsite and Bayerite are deemed suitable for use in the process of this invention.

After the brine has passed through a lithium adsorption step, it is then necessary to pass the brine through a lithium desorption step. The lithium desorption step generally is conducted by washing the sorbent with water or aqueous solutions such as a dilute lithium chloride or other lithium salt solution preferably containing about 50 mg Li/kg to about 300 mg Li/kg solution, at a temperature of about 40° C. to about 100° C. or higher if conducted under increased pressure, preferably greater than 50° C., and more preferably greater than 60° C. The desorption efficiency increases with the washing temperature. The higher the desorption efficiency, the less the amount of water required for Li desorption, and thereby the higher the lithium concentration in the eluent. To increase the purity of the eluent, it is desirable to displace the holdup of brine remaining in the void space between the particles in the sorbent bed. It typically involves use of at least about 1.2 to about 1.4 volumes of water per 1 volume of void space to be purged out before collecting high purity lithium chloride solution. Initial fractions can contain significantly increased levels of impurities relative to lithium compared to later fractions of the desorption effluent. Fractional selection of desorption segments can be fed to one or more processing steps suitable to the given TDS/Li ratio. This selection may occur during or after the purge step. The purge which contains lithium values may be recycled back to the brine for a next sorption cycle. If available, optionally a concentrated salt solution such as but not limited to solutions made of one or more of NaCl, MgCl2, KCl, CaCl2 can be used to displace the brine prior to the desorption step to minimize the lithium loss to the purge.

Heat integration can in some embodiments be necessary to improve overall energy efficiency of the DLE process. Heat integration is considered to recover energy from the Li containing brine, desorption eluent, thermal evaporator product and condensate streams and within the direct LiCl process. The lithium desorption step generally is conducted by washing the sorbent with water or a dilute aqueous solution such as lithium chloride solution preferably containing about 50 ppm Li to about 300 ppm Li, at a temperature of about 40° C. to about 100° C., preferably greater than 50° C., and more preferably greater than 65° C. Desorption eluent should be cooled down to less than 40° C., preferably less than 30° C. for the membrane processes. Heat in the desorption eluent can be used to preheat water recovered from the membrane processes before or while/as it is recycled to desorption step. This water can also be preheated using other heat sources like the lithium containing or spent brine prior to adsorption or streams from thermal evaporator, LiCl crystallizer.

After desorption, the brine is then prepared for an enrichment process. Prior to the enrichment process, it may be necessary to further treat the brine. Specifically, it may be necessary to remove impurities, such as oil and grease, free halogen, and/or other free solids and impurities. The treatment of the brine can be performed as discussed throughout the application. Preferably the brine effluent at this point should have oil and grease preferably less than about 5 ppm and more preferably less than about 1 ppm. In addition, the amount of free halogen should be less than about 5 ppm and more preferably less than about 1 ppm. Further, the total solids should be preferably less than about 10 ppm, more preferably less than about 5 ppm and more preferably less than about 1 ppm. Residual sulfur compounds including H2S or other sulfides should be reduced to less than about 100 ppm, preferably less than 50 ppm sulfur, and more preferably less than 20 ppm sulfur.

Enrichment Step

In general, the next step of the process is an enrichment step.

Generally the enrichment process should result in a substantively concentrated and purified LiCl solution of quality sufficient to be further processed into either lithium metal, LiOH, LiCl, Li2CO3 or other valuable lithium minerals. For example, in a preferred embodiment of Li2CO3 desorption effluent should have lithium concentrations of 0.25% to 5%, preferably 0.5% to 3.5% and more preferably 0.8% to 1.25%. For a preferred embodiment in the production of LiCl, the desorption effluent should have a lithium concentration of 1% to 13%, preferably 2% to 12% and more preferably 4% to 8%, as well as suitable concentrations of contaminants such as boron, calcium, magnesium, and sodium among others. A suitable ratio for boron is greater than 500:1 lithium:boron or 2000:1, preferably greater than 5000:1 or 20000:1, and more preferably greater than 8000:1 or 40000:1 by mass, respectively. A suitable ratio for calcium is greater than 50:1 or 200:1 lithium to calcium, preferably greater than 100:1 or 400:1 lithium to calcium, or more preferably greater than 160:1 or 800:1 lithium to calcium by mass. Likewise, a suitable ratio for magnesium is greater than 108:1 or 434:1 lithium to magnesium, preferably greater than 217:1 or 869:1 lithium to magnesium, or more preferably greater than 347:1 or 1739:1 lithium to magnesium by mass. A suitable strontium or other divalent content would follow with the stated calcium or magnesium scheme corrected for the difference in mass from one divalent cation relative to calcium or magnesium. A suitable ratio for sodium is less than 20:1 or 5:1 sodium to lithium, preferably 10:1 or 2.5:1 sodium to lithium, or more preferably less than 6.25:1 or 1.25:1 sodium to lithium by mass. A suitable potassium or other monovalent content would follow with the stated sodium scheme corrected for the difference in mass from one monovalent cation relative to sodium.

In order to make high purity lithium salts such as lithium chloride, lithium hydroxide, and lithium carbonate, it is desirable to remove the undesired impurities, such as Mg, Ca, boron, in the lithium chloride solution to as low as possible, less than about 1 ppm. The concentration of lithium chloride solution should also be increased to about 6% or more, preferably about 8% or more, and more preferably about 10% or more.

Typical conventional practice for the removal of divalent impurities generally requires the addition of a base, such as lime, sodium carbonate, sodium hydroxide to convert the soluble divalent chlorides to insoluble divalent salts, which are then separated from the lithium chloride solution. Although the precipitation process generally can reduce the divalent impurities in the lithium chloride solution to less than about 5 ppm, the process requires the cost for the base and produces a large amount of solid waste. The use of a basic ion exchange resin is also a way of reducing the concentration of the divalent impurities, even to less than about 1 ppm, but the process is generally even more expensive, due to the costs for the resins and for its regeneration.

The use of nanofiltration for the reduction of the divalent metallic components in the lithium chloride solution is a much more preferable process, that does not require additional consumable raw materials and generates no solid waste. The use of nanofiltration for the removal of divalent metallic impurities generally works effectively for dilute lithium chloride solutions formed in the initial sorption and desorption steps of the present process.

The majority amount of Ca and Mg present in the crude lithium chloride solution collected from the sorbent beds are first removed by the use of a nanofiltration system. Nanofiltration is a pressure-driven membrane separation process that forms the transition between ultrafiltration and reverse osmosis. Nanofiltration is applicable to separate particles ranging from about $10^{-3}$ to about $10^{-2}$ microns in size; that is, particles in a size range between those separable by reverse osmosis and ultrafiltration, although there may be significant overlap between the techniques.

Stream contacts one side of the nanofiltration membrane in the unit. Under modest pressure, preferably greater than about 25 psig, more preferably greater than about 50 psig and most preferably greater than about 100psig and less than about 1000 psig, more preferably about 800 psig, and most preferably less than about 500 psig, water is caused to flux from Stream through the membrane to produce a permeate stream. Along with water, Stream contains monovalent ions, specifically lithium and sodium among others, which permeate through the membrane under the operating conditions. Divalent impurities—to include magnesium and calcium ions among other—however, do not readily permeate through the membrane as they remain in Stream as a concentrate or retentate, effectively providing a separation between monovalent lithium ions and divalent calcium and magnesium ions. The retentate should generally contain about 50% or more of the starting divalent salts, preferably about 60% or more and more preferably about 75%. Multiple stages of nanofiltration may used to further deplete the permeate of divalent salts. Similarly, multiple stages of nanofiltration may be used to increase the relative concentration of divalent salts in the nanofiltration retentate or concentrate. For optimal processes, a majority of the starting lithium should permeate the membrane and be recovered within the permeate solutions. About 50% or more of the lithium, preferably about 60% or more, and more preferably 75% or more of the lithium should be recovered in the permeate solutions. It should be noted that flux across the membrane increases with temperature. While it is preferred to operate the process at temperatures between 25° C. and 50° C., the process is theoretically feasible at a wide range of temperatures. Further, the process can be operated at a wide range of pressures and flows, depending on the flux and recovery desired.

The nanofiltration system can be operated in a number of series or parallel configurations to accomplish the desired level of separation while maintaining a constant flux through the membrane. The nanofiltration system could be operated in single-pass operation, multiple-pass recirculation, and series configurations for removing divalent ions from the lithium-containing stream. For example, a portion of permeate produced in a subsequent reverse osmosis unit operation is recycled back between each stage in the nanofiltration system to maintain the flux. The retentate solution exiting the nanofiltration system can be recycled back to the initial lithium-containing brines or subjected to other treatment methods.

Typical conventional practice for the concentration of the lithium chloride solution calls for the use of reverse osmosis and/or evaporation. The capability of reverse osmosis is however limited to about 5% maximum lithium chloride concentration, as its osmosis pressure reaches to the maximum feasible pressure, about 1200 psi, that can be applied to a reverse osmosis membrane. Concentration can be done by solar evaporation or thermal evaporation. The former requires the availability of a large land sites, long evaporation time (in months), and is climate condition dependent. Concentration by thermal evaporation requires the capital cost for multistage evaporators with high energy consumption.

When using this step of a multi-step process of this invention, reverse osmosis process technology utilizes applied pressure to the aqueous solution concentrated, i.e., the lithium solution, to drive water from the lithium solution through a semi-permeable reverse osmosis membrane, producing a more concentrated lithium-containing solution and a separate second water stream. The pressure applied must be greater than the osmotic pressure of the lithium-containing solution for water to pass through the semi-permeable membrane.

While currently developed reverse osmosis does require application of substantial pressure to achieve concentration, it is useful in that it produces a nearly pure water stream as a result of the water that permeates through the semi-permeable reverse osmosis membrane. This water stream can then be utilized elsewhere on a plant site or recycled to the original source from which the lithium-containing solution was obtained. One advantage of using a reverse osmosis step in the multi-step processes of this invention is that it can accommodate lithium solutions of a relatively wide range of concentrations from the nanofiltration step without significant loss of lithium values in the operations. Thus the lithium solution received by and subjected to pressurized reverse osmosis through a likely plurality of semi-permeable reverse osmosis membranes in units staged in series or parallel or both, with pressure applied to the lithium solution, may initially contain in the range of about 300 to about 5000 ppm of lithium. In such a reverse osmosis operation water is forced across the semi-permeable reverse osmosis membranes while the ions contained within the feed solution are rejected and remain on the lithium solution side of the reverse osmosis membrane. Said reverse osmosis process technology provides for the concentration of the lithium solution.

Thermal Evaporator (Mechanical Vapor Recompression Setup): Following the RO step, the stream is further concentrated using a thermal evaporator equipped with a thermal evaporation technique. Thermal syphon, direct steam injection, Mechanical Vapor Recompression, etc. This setup utilizes heat and vapor recompression to enhance the evaporation process, resulting in further concentration of the solution.

Electrodialysis, a separation process based on ion movement under the influence of an electric field, can also be deployed as part of the enrichment step. This technique utilizes ion-selective membranes to allow specific ions, in this case, lithium and chloride ions, to migrate towards electrodes of opposite charge, leading to their isolation and subsequent concentration. Anion exchange resin technology can also be deployed in the enrichment step. This process utilizes specially designed anion exchange resins with a high affinity for chloride ions. As the lithium chloride solution passes through the resin bed, chloride ions selectively exchange with other anions present in the resin structure, effectively concentrating the lithium chloride in the eluate. The elution of the concentrated lithium chloride solution is achieved through subsequent treatment, resulting in a product with enhanced purity and concentration.

Membrane distillation (MD), a process allowing for concentration of a process stream through removal of water as water vapor across a hydrophobic membrane. Membrane distillation may allow for removal of more water than reverse or forward osmosis at temperatures less than standard thermal evaporation techniques. Membrane distillation techniques include but are not limited to vacuum MD, air gap MD, sweeping gas MD, and direct contact MD. In membrane distillation a heated stream is introduced to a permeable, hydrophobic membrane. Water vapor but not bulk water or dissolved salts is capable of crossing the membrane and introduced to an area of lower heat. This diffusion of water vapor is driven by the water vapor pressure as water vapor is condensed on the area of lower heat.

Crown ethers are capable of interacting with specific cations based on the structure of the ether and size of the cation. Crown ethers include both soluble and insoluble crown ethers. Crown ethers may also be immobilized on a solid scaffold or other support. Lithium cations may be selectively isolated from sodium and potassium for instance through the use of 12-crown-4, where 12 is the number of atoms forming the ring (crown) and 4 is the number of oxygen atoms present in that ring. Due to the solubility of soluble crown ethers in an organic solvent, lithium cations may be bound to the ring and then transported into an organic solvent layer in a byphasic removal process. Once in the organic solvent, the lithium may be removed from the ether and the lithium and ether recovered as known by those familiar in the art. Alternatively, a biphasic system with 15-crown-5, 18-crown-6, and 21-crown-7 could selectively remove sodium, potassium, and cesium respectively while leaving lithium within the aqueous solution. In addition to standard oxygen based crown ethers, crown ethers may also contain other heteroatoms such as nitrogen and/or sulfur allow for tuning of the interaction between ethers and selective salts. Ethers and substituted ethers may also be used for the isolation and/or removal and/or recovery of transition metals of interest. Such transition metals may be of commercial value and could be converted to a salable product or used elsewhere in the process. While the ether does not transport anion(s), anion(s) will be associated with respective cations and will also be removed along with the respective cation.

Removal of Residual Impurities

The residual divalent impurities remained in the concentrated lithium chloride solution can be removed thoroughly (less than about 1 ppm), if necessary, by precipitation or crystallization and/or ion-exchange resins. The concentrated lithium chloride solution can be first purified by the precipitation of the residual divalent impurities, Ca and Mg ions, by the chemical treatment with a base such as an aqueous solution of sodium carbonate and/or sodium hydroxide. The amount of base required is related to the reaction stoichiometry. The reaction can be done either in a batch agitated vessel or in a continuous stirring reaction system, at a temperature of 20° C. to 100° C., preferably at 70° C. to 100° C. due to inverse solubility of the divalent ions with temperature. The separation of the divalent solids from the LiCl solution can be accomplished by any known methods, such as the use of a filter, a centrifuge, and/or decantation. The solids are sent to a disposal site or to an additional process for further processing. The resulting lithium chloride solution after the separation of the divalent solids typically has less than about 5 ppm Ca and Mg.

The residual divalent impurities in the lithium chloride solution could be removed to less than about 1 ppm by passing the solution through a bed containing an ion exchange resin. Commercially available suitable resins for the removal of divalent ions include Amberlite® IRC 747 and 748 resins, manufactured by Rohm and Hass. Ion exchange resins may include more standard ion exchange resins requiring acids and bases for regeneration or by softening type ion exchanges resins capable of regeneration with a concentrated monovalent salt solution, or a mixture or series of the two.

If boron, a typical contaminant present in lithium containing source, is present, it can be removed by boron selective ion exchange resins. Commercially available suitable resins for the removal of boron include, for example, Amberlite® IRA 743 resin, manufactured by Rohm and Hass, and Diaion® CRB03 and CRB05 resins, manufactured by Mitsubishi Chemical Corporation. Boron can be removed by other known processes such as solvent extraction, chemical precipitation or membrane processes.

Formation of LiCl or Li2CO3

In this patent application, we utilize an evaporative cooling crystallizer system specifically designed for the precipitation and removal of sodium chloride impurities and optimized production of high-purity lithium chloride. The integration of solids handling equipment, including a centrifuge and dryer, within the overall process design enhances the efficiency and productivity of the entire system. The centrifuge enables effective separation of solid and liquid phases, while the dryer efficiently removes residual moisture, resulting in a high-purity lithium chloride product that meets stringent industry standards.

Once a reasonably pure and concentrated stream of LiCl having an Li:Na ratio of about 1:5 to 100:1 or better and Li:non Na impurity of 100:1 or better is available, during or after enrichment, the solution may be subjected to one or a series of units to provide for a saleable or otherwise useable LiCl salt or solution. The previously purified LiCl stream may be subjected to further evaporation. During that evaporation, selective crystallization of NaCl would allow for the advantageous removal of NaCl impurity, yielding a highly pure LiCl solution. Optionally cooling crystallization may be employed. This cooling crystallization may occur at temperatures wherein the saturation temperature with respect to sodium and/or lithium temperature is 120 C or less, optionally 45 C or less. Additionally refrigerated cooling crystallization may be employed wherein the solution is saturated or super saturated with respect to sodium and/or lithium and the solution is brought to temperatures of about 15 C or lower, optionally about 5 C or lower, optionally about 2 C or lower. Optionally the cooling crystallization and refrigerated cooling crystallization may be combined in one or more processes wherein the solution is cooled in stages with or without dwell points at given temperatures. This highly pure solution may be used or sold as is, or further evaporated to provide for crystalline LiCl or its hydrates. Crystalline LiCl or its hydrates can then be subjected to further drying techniques if needed to provide for saleable anhydrous lithium chloride or sold or used as is in suitable processes.

Alternatively, a reasonably pure solution of LiCl/NaCl/Na2CO3 that has otherwise been cleaned of Ca and Mg can be subjected to a Li2CO3 precipitation process. Na2CO3 is introduced to precipitate the LiCl as Li2CO3. Na2CO3 and NaCl plus up to 0.5 wt % Li2CO3 remain soluble in the mother liquor and should be recycled elsewhere. The Li2CO3 precipitate is then subject to one or more filtration and drying steps and sold as product. The wetcake or dried material may also be used in subsequent conversion steps to generate LiCl. A solution of nominally 0.5 wt % Li2CO3 is treated with CaCl2 to precipitate CaCO3. That solution may then be concentrated to yield saturated LiCl solution or crystalline LiCl. Alternatively the weak LiCl is used to dissolve more Li2CO3 and CaCl2 is added in an iterative fashion to yield a more concentrated stream of LiCl.

Optional Brine Pretreatment

Brines from oilfields or the smackover formation are often contaminated with impurities. Therefore in order to meet the above standards, it may be necessary to pretreat the brine fluid prior to processing. One preferred methodology includes the use of a hydrocyclone. Hydrocyclones are a type of cyclonic separators that separate product phases mainly on basis of differences in gravity with aqueous solutions as the primary feed fluid and are known in the art. Hydrocyclones are particularly useful in removing organic impurities, such as oil and gas. Other known techniques of removing oil and grease removing may be used, including phase separators and API Separators, Centrifuges, Coagulation/Flocculation Chemical Demulsification, Activated Carbon Filters, Membrane Filtration, Oil Skimmers, Ion Exchange Resins, and Integrated Treatment Systems and combinations therein.

Further, lithium brines may contain H2S which may need to be removed as well. Known methodologies of removing H2S can be used, such as H2S strippers. In addition, H2S may be removed by known techniques such as Gas stripping, vacuum degassing, oxidative conversion, electrochemical conversion, and reaction with oxides of iron or other transition metals forming insoluble sulfides. Gas stripping may use gases at standard temperature and pressure as well and including standard liquids converted to gases at elevated temperature.

Optional Removal of Additional Materials of Value

In addition to Lithium, brines useful in the present invention may contain additional materials of value. These materials include bromine and elemental sulfur, sulfur compounds, iodine, an/or cesium and the like. Therefore, it may be beneficial to remove these additional materials in a single process in order to efficiently make use of the brine.

Bromine is useful in a wide range of industries. For example, bromine is used in the manufacture of brominated flame retardants such as tetrabromobisphenol-A, decabromodiphenylethane, decabromodiphenyl oxide, and brominated polystyrenes. Bromine is also used, e.g., in the manufacture of 1,2-dibromoethane, which is used as a petrol additive, in the manufacture of compounds used in photography (e.g. silver bromide, which is the light sensitive material in film), in the manufacture of dyestuffs and drugs, in analytical laboratory in testing for unsaturation in organic compounds, as a disinfectant, and in gold extraction.

Brines that are produced in several areas of the world contain substantial quantities of bromide salts, such as sodium bromide. Processes for production of bromine from brines and other bromide-containing solutions are well known. For example, bromine can be produced by a bromine steaming out process, such as Kubierschky's distillation method; see, e.g., Kirk-Othmer, Encyclopedia of Chemical Technology, Fourth Edition, volume 4, pages 548 through 553. Other methods for recovering bromine from bromide-containing solutions are described, e.g., in U.S. Pat. Nos. 3,181,934, 4,719,096, 4,978,518, 4,725,425, 5,158,683, and 5,458,781. For example, bromine can be recovered from brines by treatment with chlorine to oxidize the bromide to bromine. Processes for electrolytic conversion of bromide to bromine are also known; but electrolytic conversion is an expensive alternative compared to other processes.

A feature of the present invention is that the removal of the additional materials can occur along multiple steps in the process. For example, one can remove the additional materials after the pretreatment but prior to the removal and concentration of lithium. However, the removal of the additional materials may occur after the removal and concentration of lithium from the brine.

Optional Recycling of Brine Materials

A key optional feature of the present invention is the multiple steps of recycling of brine effluent throughout the process. These recycling steps improve the overall lithium recovery and control the amount of liquid necessary for the performance of the lithium removal and contribute to a net zero increase in hydraulic rate of return injection into the brine source formation.

For example, there are at least three possible (or numerous) recycling steps within the process. One option, after any nano-filtration steps, the retentate or permeate can be recycled to a brine cooling tower or to the desorption step. Another option, after any reverse osmosis steps, the retentate or permeate can be recycled to a brine cooling tower or the lithium desorption step. Further, after the removal of the residual impurities, the retentate or permeate can be recycled to the cooling tower. In addition, water generated during enrichment is recycled to one or more of stages of a multistage nanofiltration system.

Another potential alternative, is boron resin spent regeneration solutions are recycled to adjust pH or osmotic strength elsewhere in enrichment or adsorption or sent to a brine cooling tower. Finally, it may be advantageous to recycle holdup volume displacement or to send such volume to a separate cleanup step for optimal lithium or heat recovery. Holdup volume is the material from the previous stage still in the column when switching from adsorb to desorb or visa versa.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1: Lithium Recovery from Brine

Lithium sorbent was prepared as set forth in U.S. Pat No. 10,648,061. 805 g of prepared sorbent was loaded into a vertical column with a bed aspect ratio of 48. Lithium bearing brine with 150 mg/kg Li and 31700 mg/kg Ca and other salts was introduced to the sorbent at 5.6 lb/hr. The brine was then displaced with 1 void volume of 200 ppm lithium as lithium chloride. The last fraction of effluent representing 17% mass of total brine fed contained 115 mg/kg. The average lithium concentration in the effluent was 61 mg/kg, representing a 60% lithium removal from brine The bed was then desorbed with a further 8.8 lb of 200 mg/kg Li solution, yielding a desorb solution containing 503 ppm Li with a Ca/Li ratio of 6.7.

Example 2: Lithium Recovery from Brine

Lithium sorbent was prepared as set forth in U.S. Pat No. 10,648,061. 805 g of prepared sorbent was loaded into a vertical column with a bed aspect ratio of 48. Lithium bearing brine with 180 mg/kg Li and 33000 mg/kg Ca, 59000 mg/kg Na, 3000 mg/kg Mg, and other salts was introduced to the sorbent at 3.3 lb/hr. The last fraction of effluent representing 18% mass of total brine fed contained 22 mg/kg Li. The average lithium concentration in the effluent was 14 mg/kg, representing a 92% lithium removal from brine. The brine was then displaced with 210 ppm lithium as lithium chloride. The bed was then desorbed with a further 7.7 lb of 190 mg/kg Li solution, yielding a desorb solution containing 520 ppm Li with a Ca:Li ratio of 1:4, Na:Li ratio of 1:3, and Mg:Li ratio of 1:15.

Example 3: Lithium Recovery from Brine

Lithium sorbent was prepared as set forth in U.S. Pat No. 10,648,061. 805 g of prepared sorbent was loaded into a vertical column with a bed aspect ratio of 48. Lithium bearing brine with 175 mg/kg Li and 30000 mg/kg Ca, 60000 mg/kg Na, and <10000 mg/kg other cations was introduced to the sorbent at 5.6 lb/hr. The last fraction of effluent at 19% mass of total brine fed contained 81 mg/kg Li. The average lithium concentration in the effluent was 34 mg/kg, representing a 80% lithium removal from brine. The brine was then displaced with 200 ppm lithium as lithium chloride. The bed was then desorbed with a further 7.7 lb of 190 mg/kg Li solution, yielding a desorb solution containing 495 ppm Li with a Ca:Li ratio of 1:14 and Na:Li ratio of 1:16

Example 4: Lithium Recovery from Brine

A suitable lithium bearing brine was obtained from a commercial bromine process. The brine had been subjected to oil removal and stripping, H2S removal, bromide removal, and pH adjustment. The brine contained 33000 ppm Ca, 175 ppm Li, 2970 ppm Mg and 57560 ppm Na. A 1"×48" column was packed with 653.2 g sorbent prepared as described in U.S. Pat. No. 10,648,061.

9 kg brine was subjected to an adsorption step by flowing the brine through the packed column at nominally 35 mL/min at between about 50-70° C. The effluent concentration was 18 ppm. The spent brine was then displaced with a 200 ppm Li solution made from lithium chloride and water. The sorbent was then subjected to a desorption step with 200 ppm Li made from lithium chloride and water. The desorption effluent contained 208 ppm Ca, 7 ppm B, 430 ppm Li, 10 ppm Mg, and 79 ppm Na.

Desorption product from multiple cycles was subjected to multipass nanofiltration and reverse osmosis using a commercially available spiral wound nanofiltration membrane and a commercially available spiral wound RO membrane. In general, material was subjected to 5 progressive nanofiltration stages wherein the permeate from one stage was subjected to a further stage until the material passed through the 5$^{th}$ stage. At each stage nominally 70% of the feed was sent forward as permeate whereas nominally 30% of the feed was retained as concentrate. The final permeate contained nominally 300 ppm Li, 19 ppm Ca, <1 ppm Mg, and 20 ppm Na. Concentrates were subjected to separate stages of nanofiltration and combined with later stage concentrates and subjected to addition nanofiltration stages. For example, the concentrate from the first stage was subjected to 3 rounds of nanofiltration. The final permeate from that sequence was combined with the second round concentrate and subjected to additional nanofiltration. The permeate generated from this sequence contained 39 ppm Ca, 313 ppm Li, 1.8 ppm Mg, and 36 ppm Na.

A series of nanofiltration treated desorption products was subjected to reverse osmosis using a commercially available spiral wound membrane. The starting material contained 31 ppm Ca, 318 ppm Li, 1.2 ppm Mg, and 38 ppm Na. Treatment with reverse osmosis yielded a concentrate with 3387 pm Li, 446 ppm Ca, 21 ppm Mg, and 138 ppm Na.

The product of reverse osmosis was subjected to a divalent removal step using a commercially available resin capable of removing divalent ions from brines. After treatment the material contained <1 ppm Ca, 2774 ppm Li, <1 ppm Mg, and 2390 ppm Na. The product following the divalent removal step was then subjected to a treatment step in which the brine was treated with a resin capable of removing boron. The feed contained 7 ppm B which was reduced to 1.6 after treatment.

The solution was then subjected to thermal evaporation until a solution temperature of 146° C. at ambient pressure was reached. The solution was then cooled to precipitate sodium chloride. The resulting slurry was subjected to centrifugation and the supernatant was decanted and filtered through a 2.7 micron filter. The density of the supernatant was 1.3 g/mL and contained 74000 ppm Li, 1117 ppm Na, 76 ppm B, 4.5 ppm Ca, and <1 ppm Mg.

Example 5: Lithium Recovery from Brine

An aqueous solution containing 4.2% LiCl and 1.7% NaCl by weight was subjected to thermal evaporation at about ambient pressure until a solution temperature of 140 C was reached. The solution was then cooled to 40 C, resulting in crystallization of a fraction of the salts. The resulting slurry was filtered through an 8-micron filter. The filtrate was retained as the supernatant which contained 45.7% LiCl and 3400 mg/kg NaCl.

Example 6: Lithium Recovery from Brine

An aqueous solution containing 2.0% LiCl and 8600 mg/kg NaCl by weight was subjected to thermal evaporation at about was reached. The solution was then cooled to 40 C, resulting in crystallization of a fraction of the salts. The resulting slurry was filtered through an 8-micron filter. The filtrate was retained as the supernatant which contained 32.8% LiCl and 6000 mg/kg NaCl. The supernatant, saturated with salts, was cooled to 1.2 C, further crystallizing a fraction of the salts. The resulting slurry was filtered through the same type of filter used in the previous step while the solution temperature was maintained at <2 C. The filtered supernatant contained 36.4% LiCl and 5200 mg/kg NaCl. The supernatant was then evaporated until a solution temperature of 137 C was reached. The solution was cooled to 40 C and the resulting slurry was filtered. The supernatant contained 45.2% LiCl and 5500 mg/kg NaCl. The supernatant was then cooled to 1.7 C and filtered again while chilled. The supernatant purity then improved to 45.2% LiCl and 2400 ppm NaCl. The supernatant was then evaporated at 137 C. The solution was cooled to 40 C and filtered again. The final purity of the filtrate was 46.2% LiCl and 1900 mg/kg NaCl.

This invention is susceptible to considerable variation in its practice. Therefore the foregoing description is not intended to limit, and should not be construed as limiting, the invention to the particular exemplifications presented hereinabove.

That which is claimed is:

1. A process for producing a high purity aqueous lithium-containing solution from a source of dissolved lithium, which process comprises:
    a. a source brine containing at least 1 mg Li/kg brine;
    b. treating the source brine in one or more pretreatment steps comprising;
        i. concentration of Li in the source brine or evaporation of water in the source brine comprising one or more of fractional freezing, membrane techniques, thermal evaporation, vacuum evaporation, cooling tower evaporation including forced or induced draft, solar evaporation, forced air evaporation or passive evaporation; and
        ii. adjustment of a temperature of the source brine to less than 110 degrees C.;
    c. processing the treated brine in a lithium adsorption step;
    d. after the adsorption step, desorbing the adsorbed lithium in a desorption step;
    e. after the desorption step and prior to an enrichment step, treating the desorption effluent to remove impurities, wherein the treatment step creates a brine of less than about 100 ppm of residual H2S or other sulfides; and
    f. after the treatment step, treating the desorption effluent in the enrichment step comprising membrane filtration and ion exchange resin; and
    g. regenerating the ion exchange resin, wherein solutions used to regenerate the ion exchange resin are recycled to adjust pH or osmotic strength elsewhere in the enrichment step or the adsorption step or the desorption step or in lithium depleted brine.

2. The process of claim 1, wherein a concentration of the Li in the source brine solution is adjusted through introduction of water or aqueous recycle streams or nanofiltration/reverse osmosis permeates or concentrates.

3. The process of claim 1, further comprising providing solutions made of one or more of NaCl, MgCl2, KCl, CaCl2 to displace the brine in the treated brine after the adsorption step prior to the desorption step to minimize the lithium loss.

4. A process for producing lithium salts comprising the process of claim 1, followed by fractional crystallization of NaCl to produce LiCl or other saleable lithium salt solutions selected from lithium bromide, lithium phosphate, lithium sulfate, lithium hydroxide and solutions and hydrates of each.

5. The process of claim 4, further comprising wherein a LiCl solution is converted to solid LiCl or its hydrates or a mixture of the two.

6. A process for producing Li2CO3 comprising the process of claim 1, followed by the introduction of Na2CO3 or K2CO3 or NaOH or KOH in the presence of CO2 to precipitate Li2CO3.

7. A process of claim 1, wherein the pretreatment steps further comprise a pretreatment step to remove impurities.

8. The process of claim 7, further comprising wherein the pretreatment step creates a brine with native hydrocarbons or other organics present as dissolved and free phase organics of less than about 0.3 wt %.

9. The process of claim 7, further comprising wherein the pretreatment step creates a brine of residual sulfur compounds including H2S or other sulfides less than about 100 ppm sulfur.

10. The process of claim 7, further comprising wherein the pretreatment step creates a brine of free halogen less than about 500 ppm.

11. The process of claim 7, further comprising wherein the pretreatment step creates a brine with total nondissolved solids less than about 1000 ppm.

12. The process of claim 1, further comprising wherein the treatment step creates a brine with native hydrocarbons or other organics present as dissolved and free phase organics of less than about 0.3 wt.

13. The process of claim 1, further comprising wherein the treatment step creates a brine of free halogen less than about 500 ppm.

14. The process of claim 12, further comprising wherein the treatment step creates a brine with total nondissolved solids less than about 1000 ppm.

15. The process of claim 1, comprising recycling lithium depleted brine effluent or any of the desorption effluent during the process.

16. The process of claim 15, wherein an aqueous solution generated during enrichment is recycled to the desorption influent.

17. The process of claim 15, wherein the aqueous solution generated during enrichment is recycled to one or more of stages of a multistage nanofiltration system.

18. The process of claim 1, wherein the enrichment step comprises one or more of the following: membrane technologies including nanofiltration, forward osmosis, reverse osmosis and osmotically assisted reverse osmosis, electrodialysis, chemical precipitation, ion exchange resins including cation exchange resins and anion exchange resins and evaporation or other water removal or concentration techniques.

19. The process of claim 18, wherein NaCl is recovered from desorption effluent or process stream during or after the enrichment step and subjected to nanofiltration, reverse osmosis, or selective precipitation and used to adjust osmotic strength of brine, desorption, or enrichment solutions, regenerate an ion exchange resin, or provide for minimized waste disposal costs as concentrated brine or for zero liquid discharge solid waste.

20. The process of claim 18, further comprising the enrichment step creating a brine effluent with lithium concentrations of 0.25% to 5.

21. The process of claim 1, further comprising wherein the treatment of the source brine creates a brine with a pH value in the range of 1-9.

22. The process of claim 1, wherein effluent desorption solution used in the desorption step contains at least 5 ppm Li.

23. The process of claim 1, wherein the lithium bearing source brine is subjected to two or more stages of adsorption in one or more contact vessels.

24. The process of claim 1, wherein in the adsorption step at least about 50% of the lithium is adsorbed.

25. The process of claim 1, wherein in the adsorption step at least about 90% of the lithium is adsorbed.

26. The process of claim 1, wherein the treatment includes fractional treatment of the solution within one or more nanofiltration or RO units or any combination of the two units in step (e) and subsequent permeate is recycled elsewhere in the process.

27. The process of claim 1, wherein the lithium desorption step is conducted by washing sorbent with water or a dilute aqueous solution of lithium chloride containing 50-300 ppm Li, at a temperature of 40-100° C.

* * * * *